United States Patent [19]

Day

[11] Patent Number: 4,700,133
[45] Date of Patent: Oct. 13, 1987

[54] VARIABLE RELUCTANCE MAGNETIC SENSOR WITH POLE PIECE AND SHELL PROJECTIONS MATCHED TO GEAR TEETH

[75] Inventor: William J. Day, Raleigh, N.C.

[73] Assignee: SSI Technologies, Inc., Janesville, Wis.

[21] Appl. No.: 834,931

[22] Filed: Feb. 28, 1986

[51] Int. Cl.[4] .................. G01B 07/14; G01P 03/42
[52] U.S. Cl. ..................... 324/208; 324/174; 324/179; 324/262; 310/168; 336/45; 336/221
[58] Field of Search ............... 324/207, 208, 234, 236, 324/239, 242, 260–262, 173, 174, 176, 179; 310/155, 168, 166, 169, 171; 336/45, 214, 30, 96, 83, 212, 221

[56] References Cited

U.S. PATENT DOCUMENTS

| | | |
|---|---|---|
| 3,492,518 | 1/1970 | Wayne . |
| 3,626,225 | 12/1971 | Pauwels ............................ 324/174 X |
| 3,626,226 | 12/1971 | Pauwels ............................ 324/174 X |
| 3,942,045 | 3/1976 | Palazzetti . |
| 3,947,711 | 3/1976 | Presley et al. .................... 310/168 X |
| 3,980,913 | 9/1976 | Peterson ........................... 310/168 X |
| 4,002,937 | 1/1977 | Anson . |
| 4,011,478 | 3/1977 | Reenstra .......................... 310/168 X |
| 4,171,495 | 10/1979 | McNinch, Jr. .................. 310/168 X |
| 4,215,286 | 7/1980 | Ornee ............................... 310/168 X |
| 4,268,771 | 5/1981 | Lace . |
| 4,384,252 | 5/1983 | Kolter ................................. 324/239 |

OTHER PUBLICATIONS

Electro Corporation Catalog No. 83AS103, Model 3111A, 1845 57 Street, P.O. Box 3049, Sarasota, Fla. 33578-3049, 1983.
Electro Corporation Catalog No. 83AC100, 1845 57 Street, P.O. Box 3049, Sarasota, Fla. 33578-3049, 1983.
A Technical Applications Handbook, "Sensing and Controlling the Industrial World", Electro Corporation, 1845 57 Street, P.O. Box 3049, Sarasota, Fla. 33578-3049, 1981.

Primary Examiner—Reinhard J. Eisenzopf
Assistant Examiner—Warren S. Edmonds
Attorney, Agent, or Firm—Andrus, Sceales, Starke & Sawall

[57] ABSTRACT

A variable reluctance magnetic speed sensor senses the speed of a rotating gear (12). A ferrous outer cylindrical shell (22) extends axially and has a magnet (14) at one axial end and a coil (16) at the other axial end. An inner pole piece (4) in the coil (16) directs magnetic flux across a gap to the gear teeth (10), which flux is returned by the outer pole piece shell (22) to the magnet (14). Particular pole piece gap spacings are disclosed together with various pole piece constructions.

2 Claims, 8 Drawing Figures

LOW RELUCTANCE PATH

HIGH RELUCTANCE PATH

LOW RELUCTANCE PATH

HIGH RELUCTANCE PATH

EFFECTIVE GAP SPACING

4,700,133

VARIABLE RELUCTANCE MAGNETIC SENSOR WITH POLE PIECE AND SHELL PROJECTIONS MATCHED TO GEAR TEETH

BACKGROUND AND SUMMARY

The invention relates to variable reluctance magnetic speed sensors, for example for sensing the speed of a rotating gear.

Magnetic speed sensors are known in the art, and operate on the principle of a changing magnetic field producing a voltage signal. The approach and passing of a discontinuity, such as a gear tooth, changes the magnetic field, which change induces a voltage in a coil. An example is shown in Electro Corporation Catalog Nos. 83AS103 and 83AC100, 1983, and A Technical Applications Handbook, "Sensing and Controlling The Industrial World", Electro Corporation, 1981.

The present invention relates to improvements in magnetic field flux coupling for greater sensitivity.

DETAILED DESCRIPTION

Figure 1:
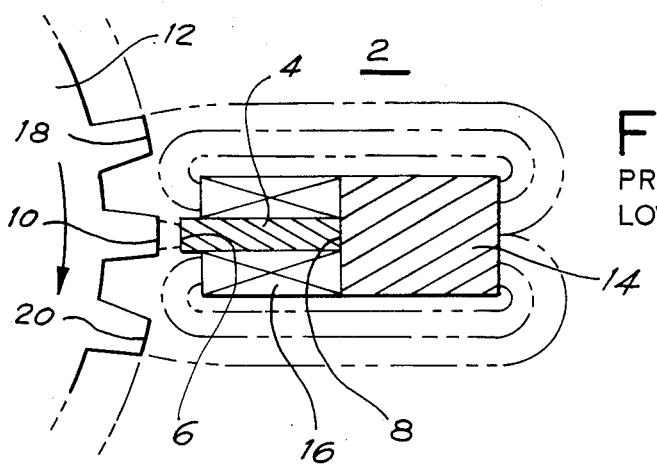
FIG. 1 is a schematic illustration of a variable reluctance magnetic sensor known in the art, and shows a low reluctance path.
Figure 2:
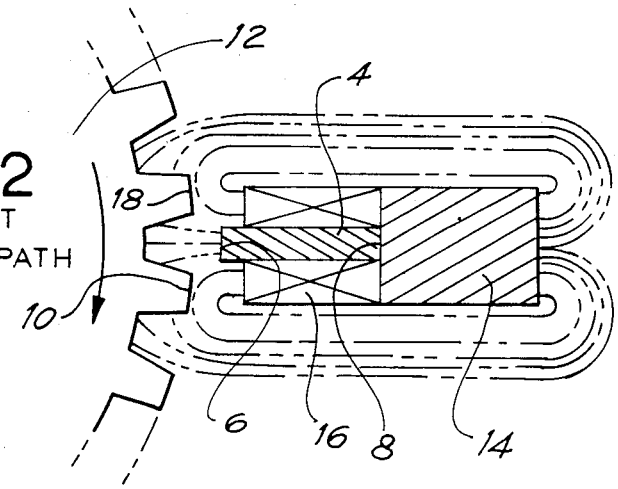
FIG. 2 shows the prior art sensor of FIG. 1 but with a high reluctance path.

FIG. 1 shows a prior art variable reluctance magnetic sensor 2. A ferrous inner pole piece 4 has left and right distal ends 6 and 8. Left end 6 is a sensing end for sensing movement of a ferrous object therepast, such as gear tooth 10 on rotating gear 12. A magnet 14 is at the right end 8 of the pole piece to create a magnetic field directed leftwardly through pole piece 4 and leftwardly outwardly from end 6 to bridge the gap to tooth 10. A coil of wire 16 is wrapped around pole piece 4 for generating a voltage signal due to magnetic field change caused by movement of gear 12, with tooth 10 breaking flux lines from the left end 6 of the pole piece 4. The flux path extends through gear 12 and then is returned at teeth 18 and 20 back to magnet 14. FIG. 1 shows a low reluctance path with the tightest flux coupling, i.e., the smallest gap between pole piece end 6 and tooth 10. FIG. 2 shows a high reluctance path condition because of the greater spacing between pole piece end 6 and a gear tooth. The differences between the low and high reluctance paths change the flux coupling and magnetic field, which changing magnetic field induces the voltage signal in coil 16. The passage of each gear tooth causes the noted change in the magnetic field, and the number of changes are counted over a given time interval to thus measure the rotational speed of the gear.

Figure 3:
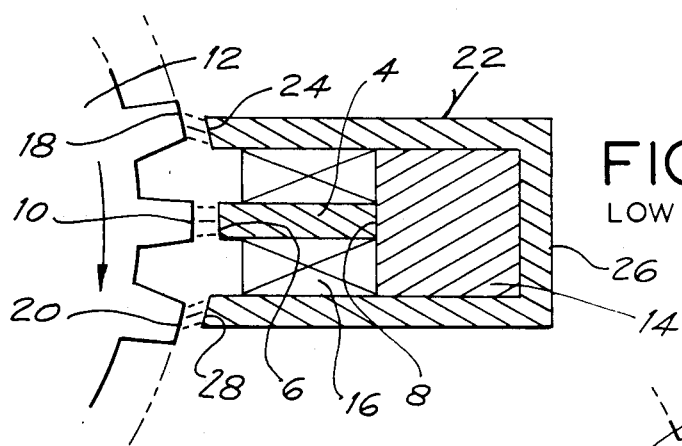
FIG. 3 shows a sensor in accordance with the invention, and illustrates a low reluctance path.
Figure 4:
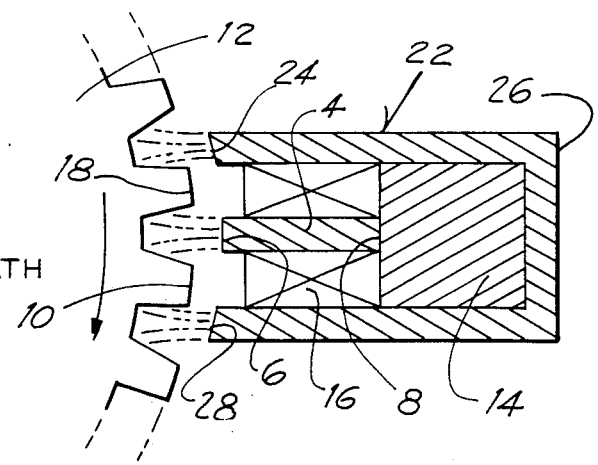
FIG. 4 shows the sensor of FIG. 3, but illustrates a high reluctance path.

FIG. 3 shows a sensor in accordance with the invention and includes all of the components from FIG. 1, plus a ferrous return path outer pole. FIG. 3 uses like reference numerals as FIG. 1 where appropriate to facilitate clarity. A ferrous outer pole piece 22 is provided around the coil and magnet and concentrates the return path of the magnetic flux field to optimize coupling. The outer pole piece has a left end 24 spaced from left end 6 of the inner pole piece generally along a direction parallel to the arc of gear movement. The right end 26 of the outer pole piece is adjacent magnet 14 for returning magnetic flux to the magnet. The magnetic flux path extends from magnet 14 leftwardly through inner pole piece 4 then across the gap to tooth 10 then through gear 12 then across the gaps from teeth 18 and 20 to left outer pole piece ends 24 and 28, respectively, then through outer pole piece 22 back to magnet 14. Pole piece ends 6 and 24, and 6 and 28, are spaced by an integral number of gap widths between the gear teeth such that a low reluctance path condition is provided when one gear tooth such as 10 is aligned with inner pole piece 4 and another gear tooth such as 18 is aligned with outer pole piece end 24 and another gear tooth such as 20 is aligned with outer pole piece end 28. A high reluctance path condition, FIG. 4, is provided when the inner and outer pole piece ends 6, 24 and 28 are aligned with the gaps between the gear teeth.

Figure 5:
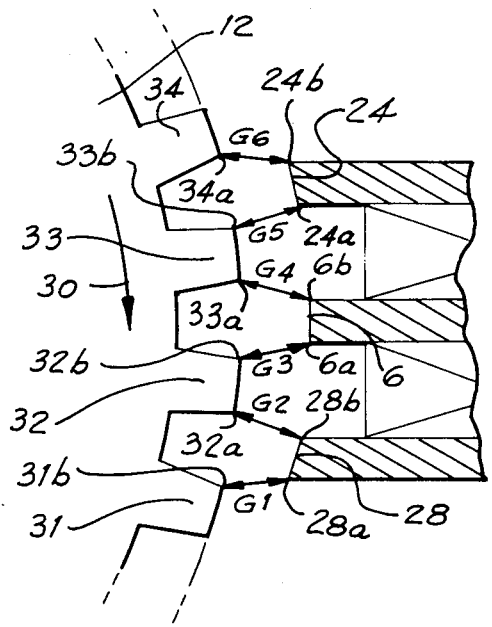
FIG. 5 shows a portion of FIG. 4 and illustrates gap spacing.

FIG. 5 illustrates effective gap spacing. The outer pole piece upper and lower ends 24 and 28 are above and below inner pole piece end 6 therebetween. Rotating gear 12 moves in an arc 30 across the flux lines from the pole piece ends 24, 6 and 28 and includes first, second, third and fourth consecutive gear teeth 31, 32, 33 and 34 of equal width and spacing, each having upper and lower edge tips separated by the width of the tooth. The lower outer pole piece end 28 has a lower edge tip 28a separated from the upper edge tip 31b of the first gear tooth 31 by a gap G1. Lower outer pole piece end 28 has an upper edge tip 28b separated from lower edge tip 32a of the second gear tooth 32 by a gap G2. Central inner pole piece end 6 has a lower edge tip 6a separated from the upper edge tip 32b of second gear tooth 32 by a gap G3. Central inner pole piece end 6 has an upper edge tip 6b separated from the lower edge tip 33a of third gear tooth 33 by a gap G4. Upper outer pole piece end 24 has a lower edge tip 24a separated from the upper edge tip 33b of third gear tooth 33 by a gap G5. Upper outer pole piece end 24 has an upper edge tip 24b separated from the lower edge tip 34a of fourth gear tooth 34 by a gap G6. In the preferred embodiment of the invention, the spacing of pole piece ends 24, 6 and 28 is selected such that G1=G2=G3=G4=G5=G6 in the high reluctance condition. As seen in FIG. 5, the upper and lower outer pole piece ends 24 and 28 are tapered along their faces between edge tips 24a and 24b, and 28a and 28b, respectively, to provide the noted condition G1= G2=G3=G4=G5=G6 in the high reluctance condition.

Figure 6:
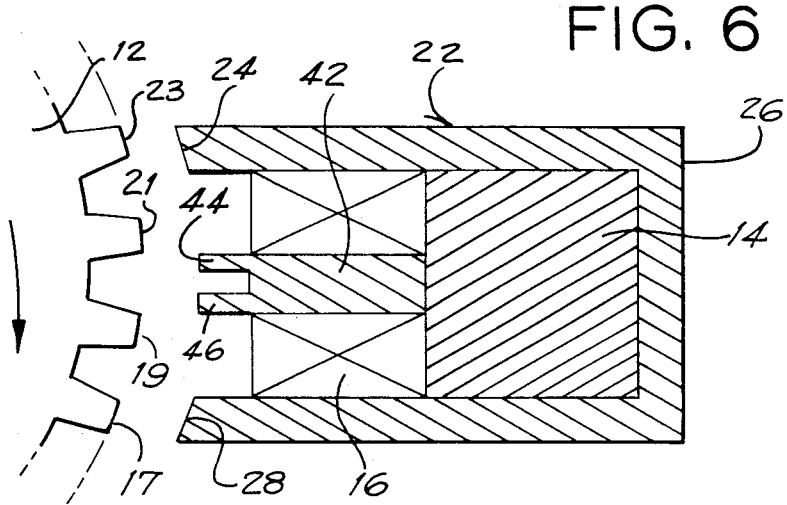
FIG. 6 shows an alternate embodiment of the sensor in FIG. 3.

FIG. 6 shows an alternate embodiment of FIG. 3, and like reference numerals are used where appropriate to facilitate clarity. A ferrous inner pole piece 42 is a split fork-like member with a pair of leftwardly extending parallel tines 44 and 46 at its left end. In this embodiment, the gear has first, second, third and fourth consecutive gear teeth 17, 19, 21 and 23, respectively, such that in the low reluctance condition the lower end 28 of the outer pole piece is aligned with first gear tooth 17, the first lower tine 46 is aligned with second gear tooth 19, the second upper tine 44 is aligned with third gear tooth 21, and the upper end 24 of the outer pole piece is aligned with fourth gear tooth 23. The tines focus and concentrate the flux across the gap.

Figure 7:
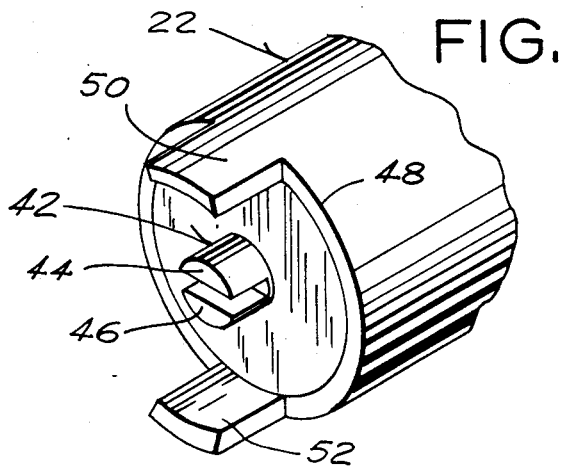
FIG. 7 is a perspective view of a sensor in accordance with the invention and illustrates further modifications.

FIG. 7 shows a further embodiment wherein the outer pole piece 22 is a ferrous cylindrical shell. Magnet 14 is in the shell at the right end, and coil 16 is in the shell at the left end. Inner pole piece 4 or 42 is in the coil and directs magnetic flux leftwardly therebeyond. The flux is returned by shell 22 to the magnet, such that a ferrous object moving adjacent the left end of the shell will vary the flux coupling and reluctance from the inner pole piece to the shell. The left edge 48 of the shell may provide the outer pole piece end facing across the gap from the gear teeth or other moving object. Alternatively, the shell may include a pair of leftwardly extending legs 50 and 52 extending beyond end face or edge 48 and providing a smaller gap to the gear teeth and tighter flux coupling.

Figure 8:
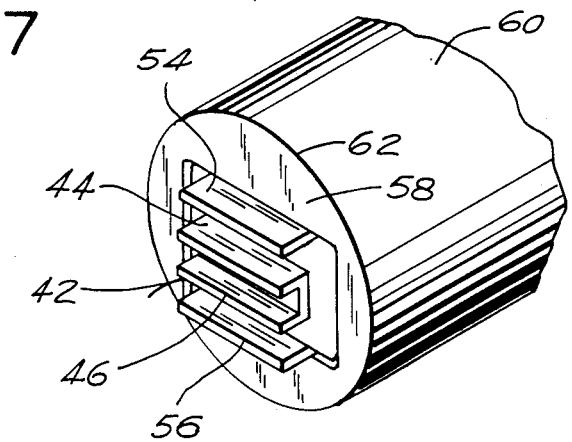
FIG. 8 shows a further alternative to FIG. 7.

In a further alternative, FIG. 8, return path legs 54 and 56 may be provided on the end face 58 of ferrous outer pole piece shell 60 and spaced inwardly from outer edge 62. This enables proper spacing of the pole piece ends relative to gear teeth spacing for a particular application. The return flux path is through rightwardly legs 54 and 56, then radially outwardly through end face 58 to edge 62, then axially rightwardly through shell 60.

It is recognized that various equivalents, alternatives and modifications are possible within the scope of the appended claims.

I claim:

1. A variable reluctance magnetic sensor comprising:
   a ferrous inner pole piece extending axially and having distal axial ends, one end being a sensing end for sensing movement of a ferrous object therepast;
   a magnet at the other end of said inner pole piece to create a magnetic field directed axially through said inner pole piece;
   a coil wrapped around said inner pole piece for generating a voltage signal due to magnetic field change caused by movement of said object breaking flux lines extending from said one end of said inner pole piece; and
   a ferrous outer cylindrical shell around said coil and extending axially and having distal axial ends, one end of said shell being radially spaced from said one end of said inner pole piece along a direction generally parallel to said movement of said object, the outer end of said shell being adjacent said magnet for returning magnetic flux, and comprising two projecting legs extending from said one end of said shell axially toward said object adjacent the path of movement of said object to provide an outer pole piece end for return coupled flux and providing a smaller gap to said object and tighter flux coupling, wherein said two projecting legs are radially spaced from one another by an amount less than the diameter of said shell along a direction generally parallel to the direction of movement of said object, each said leg being spaced radially inwardly from the outer cylindrical edge of said shell such that the return coupled flux path extends axially through said projecting legs then radially outwardly through said one end of said shell and then axially through said shell.

2. The invention according to claim 1 wherein said one end of said inner pole piece has a split fork-like configuration with a pair of tines, and wherein each of said legs is spaced from a respectively adjacent said tine by a distance equal to the spacing between said tines

* * * * *

UNITED STATES PATENT AND TRADEMARK OFFICE
CERTIFICATE OF CORRECTION

PATENT NO. : 4,700,133
DATED : October 13, 1987
INVENTOR(S) : WILLIAM J. DAY

It is certified that error appears in the above-identified patent and that said Letters Patent is hereby corrected as shown below:

Claim 1, column 4, line 14, delete "outer" and insert --other--

Signed and Sealed this

Tenth Day of May, 1988

Attest:

DONALD J. QUIGG

Attesting Officer

Commissioner of Patents and Trademarks